(12) United States Patent
Fukunaga et al.

(10) Patent No.: US 7,502,133 B2
(45) Date of Patent: Mar. 10, 2009

(54) ACCESSING ADDITIONAL INFORMATION ASSOCIATED WITH THE IMAGE AND SENDING THE ADDITIONAL INFORMATION TO A SECOND USER TERMINAL

(75) Inventors: Yoshitsugu Fukunaga, Tokyo (JP); Takuya Shimomura, Tokyo (JP); Tadashi Suzuki, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 924 days.

(21) Appl. No.: 10/936,587

(22) Filed: Sep. 9, 2004

(65) Prior Publication Data

US 2005/0052695 A1  Mar. 10, 2005

(30) Foreign Application Priority Data

Sep. 10, 2003 (JP) ............................. 2003-318551
Sep. 2, 2004 (JP) ............................. 2004-256044

(51) Int. Cl.
*G06F 3/12* (2006.01)
*G06K 15/00* (2006.01)

(52) U.S. Cl. ........................ 358/1.15; 358/1.16; 358/1.1

(58) Field of Classification Search ................ 358/1.15, 358/1.13, 1.1, 1.2, 1.5, 1.6, 1.9, 1.14, 1.16, 358/1.18, 407, 468; 379/88.13; 705/14; 709/219, 207; 347/2, 3, 5; 399/1, 8; 707/104.1, 707/10, 9

See application file for complete search history.

(56) References Cited

FOREIGN PATENT DOCUMENTS

| JP | 2001-51368 A | 2/2001 |
| JP | 2002-118680 A | 4/2002 |
| WO | WO 0072577 A1 * | 11/2000 |

* cited by examiner

*Primary Examiner*—Dov Popovici
(74) *Attorney, Agent, or Firm*—Birch, Stewart, Kolasch & Birch, LLP

(57) ABSTRACT

An image uploaded from a camera-equipped cellular phone, and additional information attached to the image such as voice information and the like are managed in a database in a service server. Then, an URL for accessing the additional information is issued and converted into a QR code. Order information including the image and the QR code are sent to the print device, and a photo print having the image and the QR code printed on a print paper is produced. When the camera-equipped cellular phone reads the QR code on the photo print and accesses by use of the URL acquired by decrypting the above described QR code, the managed additional information on the image is read from the database correspondingly to the URL, and sent to the camera-equipped cellular phone which has accessed.

13 Claims, 4 Drawing Sheets

ACCESSING ADDITIONAL INFORMATION ASSOCIATED WITH THE IMAGE AND SENDING THE ADDITIONAL INFORMATION TO A SECOND USER TERMINAL

This Non-provisional application claims priority under 35 U.S.C. § 119(a) on Patent Application No(s). 2003-318551 and 2004-256044 filed in Japan on Sep. 10, 2003 and Sep. 2, 2004 respectively, the entire contents of which are hereby incorporated by reference.

BACKGROUND OF THE INVENTION

1. Field of the Invention

The present invention relates to a service server and a print service method, and more particularly to the service server and the print service method for accepting a print order for an image uploaded from a user terminal such as a camera-equipped cellular phone, a personal computer (PC), a personal digital assistance (PDA) and the like.

2. Description of the Related Art

Conventionally, a talk photo production system has been proposed which prints voice data on a photo print as a bar code, and reads this bar code by means of a bar code reader to convert the bar code into voice to be pronounced (Japanese Patent Application Publication No.2001-51368).

In addition, a mobile communication terminal (camera-equipped cellular phone) has been proposed which can shoot a two-dimensional code (for example, a QR code) printed on an advertising medium such as a poster, a wall banner, a community magazine or the like and decrypt the two-dimensional code to acquire information (Japanese Patent Application Publication No.2002-118680).

The above described two-dimensional code includes a URL (Uniform Resource Locators) of a site, in which detailed information on products or services to be advertised is posted, and the above described camera-equipped cellular phone may access the above described site by means of the URL included in the two-dimensional code.

Accordingly, a user can access easily the site related to a desired advertising medium.

SUMMARY OF THE INVENTION

There are several problems related to the Japanese Patent Application Publication No.2001-51368. In order to generate the voice from the photo print produced by the talk photo production system according to the Japanese Patent Application Publication No.2001-51368, a reproduction device dedicated for reading the bar code on the photo print to convert the bar code into the voice to be pronounced is necessary. Moreover, the amount of information, which may be recorded in the bar code on the photo print, is not enough to reproduce a human voice adequately or to reproduce the voice for long hours. Furthermore, once the bar code indicating the voice data is recorded on the photo print, the voice data cannot be updated.

On the other hand, the camera-equipped cellular phone according to the Japanese Patent Application Publication No.2002-118680 can shoot the two-dimensional code printed on the advertising medium, decrypt the shot two-dimensional code to acquire the URL of a destination to be connected, and connect the destination by means of the URL to obtain necessary information. However, the Japanese Patent Application Publication No.2002-118680 does not describe a technology or a mechanism for obtaining additional information such as the voice associated with a user image.

The present invention has been made in view of these circumstances and an object of the present invention is to provide a service server and a print service method which can accept a print instruction for the image uploaded from a user terminal such as the camera-equipped cellular phone and the like, and especially realize a service in which the user can utilize a finished photo print to obtain the additional information such as the voice, position information, the music and the like associated with the image for which the print order has been accepted easily.

To achieve the above described object, the first aspect of the present invention is characterized, in a service server for communicating with a first user terminal and a second user terminal via a network and accepting a print instruction for an image uploaded from the first user terminal, comprising:

a receiving device which receives the image for which the print instruction is given from the first user terminal, and additional information associated with the image;

a database which manages the additional information on the received image;

an access information issuing device which issues access information for accessing the additional information managed in the database;

a print instruction device which sends a string or a code including the access information, along with the image for which the print instruction has been accepted, to a printer to print the string or the code and the image on a print medium; and a sending device which, when the second user terminal accesses, based on the string or the code including the access information printed on the print medium, by using the access information, reads from the database the additional information corresponding to the access information, and sends the additional information to the second user terminal which has accessed.

In other words, when the service server accepts an instruction for the photo print from the first user terminal via the network, it receives the image and the additional information associated with the image and manages them in the database. Then, the service server issues the access information (URL) for accessing each of the additional information, and sends the string or the code including this access information, and the image for which the print instruction has been accepted, to the printer to print them on the print medium such as a print paper and the like. The photo print including the string or the code including the access information printed thereon in this way is delivered to a user-appointed agency, a user's home or the like. Alternatively the photo print may be printed with a user's printer. Then, when the access is executed by operating the second user terminal to input the string of the access information printed on the above described photo print, or by reading the code of the access information (a bar code, a two-dimensional code and the like) with the second user terminal having a code reading function, the service server reads the additional information from the database correspondingly to the access information, and sends the additional information to the second user terminal. Thus the user can use the string or the code including the access information printed on the photo print to obtain the additional information associated with the image of the photo print easily.

The second aspect of the present invention is characterized in that, in the service server of the first aspect, the additional information includes at least one of voice information, position information, text information and music information.

The third aspect of the present invention is characterized in that, in the service servers of the first to the second aspects, the additional information includes shooting position information, and the sending device sends, based on the shooting position information read out from the database, map information including the position information.

The fourth aspect of the present invention is characterized in that, in the service servers of the first to the third aspects, the printer is a printer in the service server, or a printer in a printer server connected to the network.

The fifth aspect of the present invention is characterized in that, in the service servers of the first to the fourth aspects, the database manages the received image and the additional information associated with the image, and when the second user terminal accesses, based on the string or the code including the access information printed on the print medium, by using the access information, the sending device reads from the database an image managed correspondingly to the access information, and sends the image to the second user terminal. In other words, it is possible to acquire the additional information on the image while it is possible to browse the image.

The sixth aspect of the present invention is characterized in that, in the service servers of the first to the fifth aspects, the additional information includes the voice information, and when the receiving device receives newly the voice information associated with the image managed in the database, from the first or the second user terminal, the newly received voice information is attached to the image in the database, or the voice information on the image is updated with the newly received voice information. In other words, not only when the image is uploaded, but always it is possible to send the voice information to the service server. If the image does not include the voice information, the voice information is attached to the image newly, and if the image includes the voice information, the voice information is updated to the latest voice information.

The seventh aspect of the present invention is characterized in that, in the service servers of the first to the sixth aspects, the first user terminal is a camera-equipped cellular phone.

The eighth aspect of the present invention is characterized in that, in the service servers of the first to the seventh aspects, the code including the access information is a two-dimensional code.

The ninth aspect of the present invention is characterized in that, in the service servers of the eighth aspects, the second user terminal is a camera-equipped cellular phone having a function of decrypting the image in which the two-dimensional code has been shot to acquire the access information.

The tenth aspect of the present invention is characterized in that, in the service servers of the first to the ninth aspects, the first user terminal and the second user terminal are identical to each other.

A print service method for performing print service via a network according to the eleventh aspect of the present invention is characterized by including the steps of: uploading an image for which a print instruction is given from a first user terminal via a network, and additional information associated with the image to a service server; managing the additional information in a database; issuing access information for accessing the additional information; printing a string or a code including the access information, along with the image for which the print instruction has been accepted, onto a print medium; accessing from a second user terminal, based on the string or the code including the access information printed on the print medium, by using the access information; and when the access is executed by using the access information, reading from the database the additional information corresponding to the access information, and sending the additional information to the second user terminal.

A user terminal according to the twelfth aspect of the present invention is characterized, in an image data communication system in which the user terminal and a service server may communicate with each other via a network, by including: a print image designation device which designates the image data to be printed; a print image display device which displays image data to be printed; an additional information input device which inputs additional information associated with the image data to be printed; and an additional information sending device which sends the additional information inputted by the additional information input device, to the service server; an access information input device which inputs a string or a code including access information for accessing the additional information issued by the service server; an access information sending device which sends the access information to the service server; an additional information receiving device which receives the additional information corresponding to the access information from the service server; and an additional information output device which outputs the additional information.

The thirteenth aspect of the present invention is characterized, in the user terminal of the twelfth aspect, by further including: a print image storage device which stores at least one or more of the image data to be printed, and a print image sending device which sends the image data to be printed, to the service server. In other words, it is possible to display desired image data from a plurality of image data in the user terminal and designate the desired image data for printing.

A software executed/implemented by computer, in an image data communication system in which a user terminal and a service server may communicate with each other via a network, for controlling the user terminal, according to the fourteenth aspect of the present invention, comprising: prompting to designate the image data to printed; displaying image data to be printed to be designated; prompting to input additional information associated with the image data to be printed; sending the designated image data and the inputted additional information to the service server; prompting to input a string or a code including access information for accessing the additional information issued by the service server; sending the access information to the service server; receiving the additional information corresponding to the access information from the service server, and outputting the additional information.

According to the present invention of the above described configuration, it is possible to accept the print instruction for the image uploaded from the user terminal such as the camera-equipped cellular phone and the like, and especially, it is possible to realize the service in which the user can utilize the string or the code of the access information printed on the finished photo print to obtain easily the additional information such as the voice, the position information, the music and the like associated with the image for which the print instruction has been accepted. Therefore, the way of enjoying the photo print may be broadened for the user.

DETAILED DESCRIPTION OF THE PREFERRED EMBODIMENTS

A preferred embodiment of a service server and a print service method according to the present invention will be described below in detail with reference to the accompanying drawings.

Figure 1:
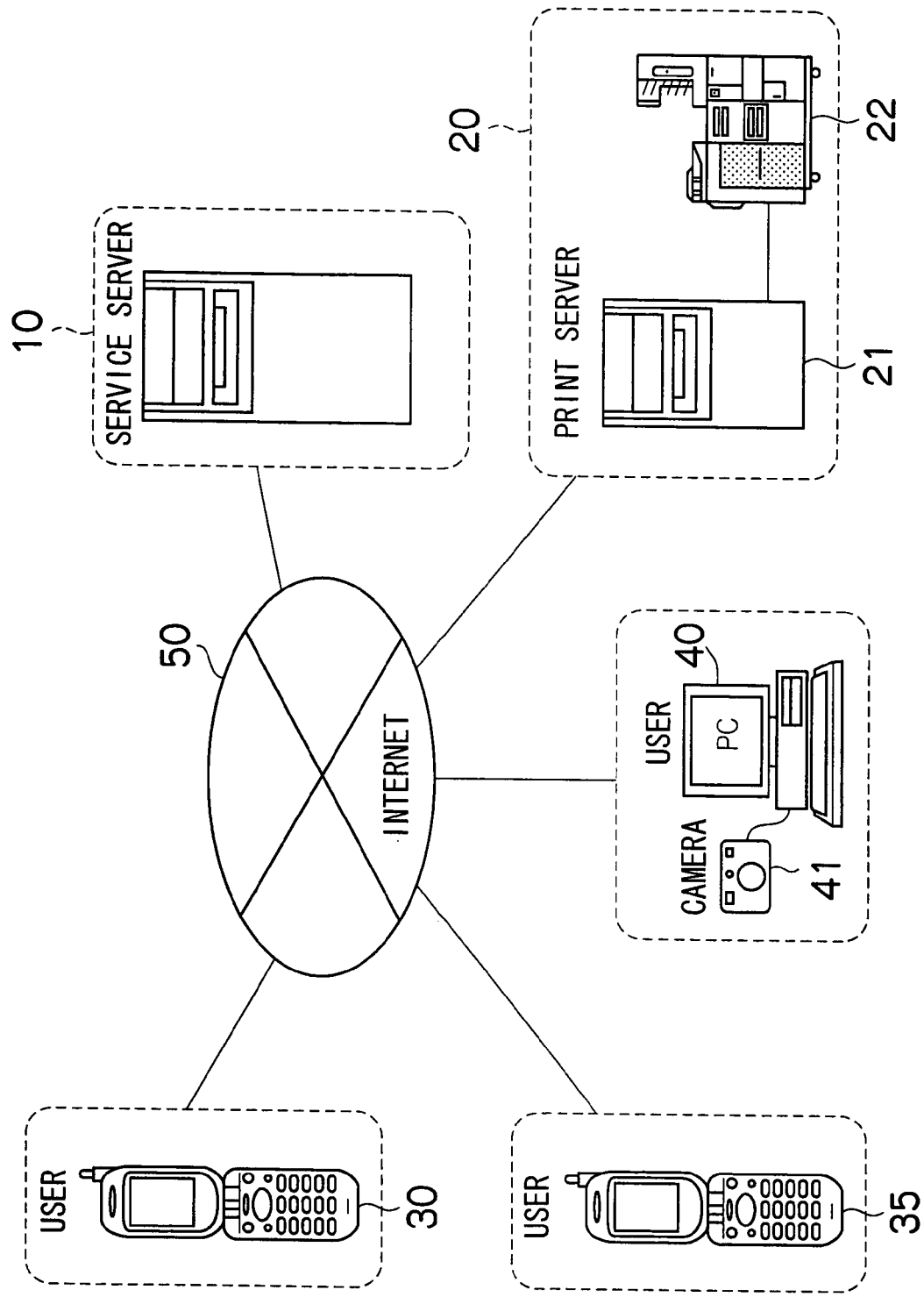
FIG. 1 is a system configuration diagram showing a print service system for realizing a print service method according to the present invention.

FIG. 1 is a system configuration diagram showing a print service system for realizing the print service method according to the present invention. This system comprises a service server 10, a print server 20, a camera-equipped cellular phone 30 as a first user terminal, a camera-equipped cellular phone 35 as a second user terminal, and a PC 40, which may be connected with one another through the Internet 50. In addition to the Internet 50, the network may be a public circuit network, wireless LAN and the like.

Figure 2:
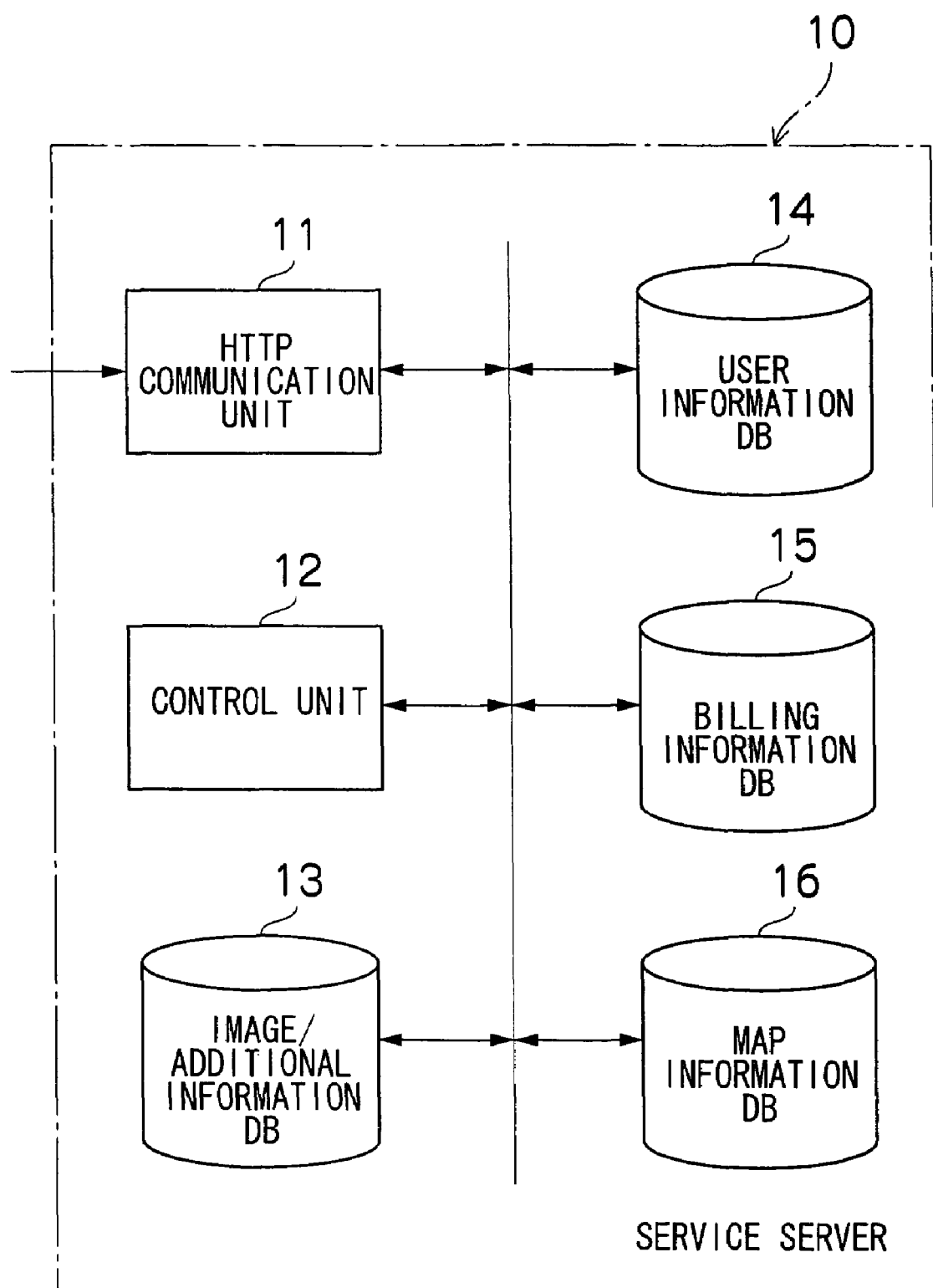
FIG. 2 is a block diagram showing an embodiment of a service server.

FIG. 2 is a block diagram showing an example configuration of the service server 10.

As shown in FIG. 2, the service server 10 mainly comprises an HTTP (Hypertext Transfer Protocol) communication unit 11; a control unit 12; an image/additional information database 13 for registering and managing an image uploaded from a user and additional information on that image; a user information database 14 for managing user information such as a user ID, a password, a name, an address, a mail address and the like; a billing information database 15 for managing billing information required for billing such as a print count, a print size, a charge for print, a charge for image storage and the like; and a map information database 16 for managing map information associated with GPS information such as a latitude, a longitude and the like positioned by a GPS device (Global Positioning System).

The control unit 12 for supervising and controlling the respective units in the service server 10, includes browsing software using a browser, management software, URL issuing software and the like, registers the image for which a print order has been given, and which has been accepted via the HTTP communication unit 11, and additional information on the image, on the image/additional information database 13, issues an URL for accessing each image or the additional information registered on the image/additional information database 13, and produces a code (for example, a two-dimensional code such as a QR code) indicating a string of the URL from the string. Then the control unit 12 sends the QR code indicating the URL issued for each image, along with order information (information such as the image data for which the print order has been given, the print size, the user information and the like), via the HTTP communication unit 11 to the print server 20.

Moreover, when the control unit 12 receives an IP address of the URL for accessing the image and the additional information, and an HTTP request via the HTTP communication unit 11, the control unit 12 reads desired image/additional information which is identified with the IP address and the HTTP request received, out of the information in the image/additional information database 13, and sends the image or the additional information with respect to an apparatus which has accessed to give the request.

In FIG. 1, the print server 20 comprises a server computer 21 and a print device 22. Based on the order information and the QR code received from the service server 10, the print server 20 produces a photo print having the image and the QR code printed on a print paper by means of the print device 22.

It should be noted that, instead of the QR code, the URL may be sent to the print server 20 from the service server 10 so that the print server 20 may convert the URL into the QR code for printing, or the string of the URL may be printed directly.

The photo print having the QR code printed thereon at the print server 20 is delivered to a recipient such as a convenience store, a photo shop or the like which the user has appointed, or alternatively the photo print is delivered directly to the user's home.

Moreover, the print server 20 is not limited to be at one place, but it is preferable to install the print server 20 at a plurality of places so that the service server 10 may transfer the order information and the QR code to the print server which is nearest from an user-designated address for delivery. Furthermore, the print server 20 may not be installed and the print device may be installed in the service server 10. In addition, the photo print having the image and the QR code printed thereon may be produced by the user's printer.

The camera-equipped cellular phone 30 (hereinafter simply referred to as "cellular phone") has an e-mail function or a function of inputting the URL to access a Web site on a WWW server, in addition to a typical calling function. Moreover, the image shot by the cellular phone 30 may be stored in a medium in the cellular phone, or may be attached to an e-mail and sent to a destination.

Moreover, if the print order for the shot image is given through the Internet 50, for example, a print order application is started, the image for the print order is selected from images stored in the medium in the cellular phone, voice information such as a comment is attached to the selected image, and then such information is uploaded to the service server 10.

Besides the images stored in the cellular phone, the image which has been already uploaded to the service server 10 may be selected, the voice information such as the comment may be attached to the selected image, and then such information may be uploaded to the service server 10.

Furthermore, the cellular phone 35 has a function of identifying the QR code printed on the photo print and decrypting the identified QR code to acquire the URL. By using the URL acquired in this way and accessing the service server 10, the cellular phone 35 may receive the additional information (the voice information and the like) on the image on the photo print having the QR code printed thereon, from the service server 10, and reproduce the additional information.

Figure 3:
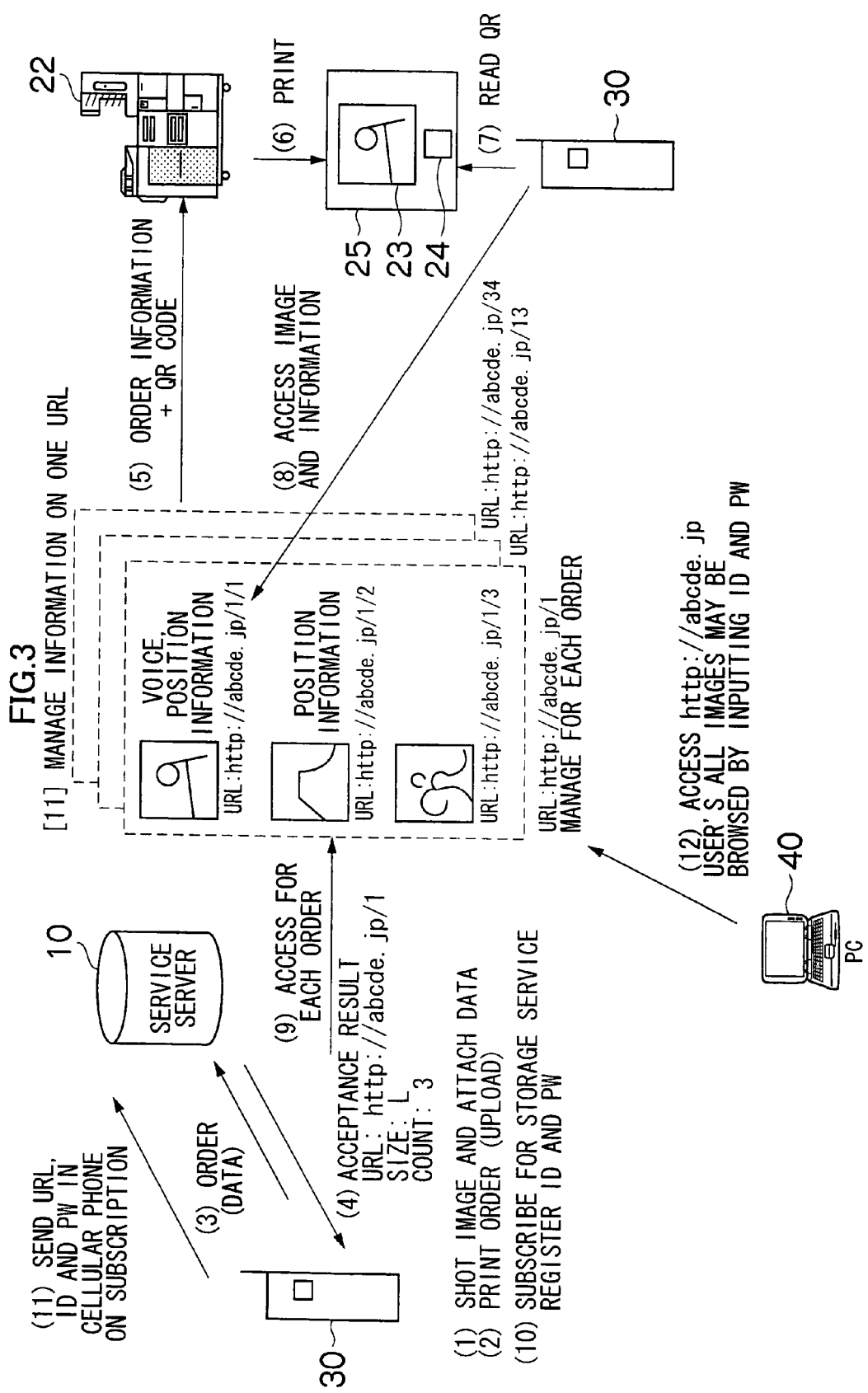
FIG. 3 shows flows of processes or information in the print service system.

Next, with reference to FIG. 3, flows of producing the photo print from the print order and a service in which the additional information attached to the photo print is provided to the user will be described below.

(1) The image is shot by means of the cellular phone 30 and stored in the medium in the cellular phone. If the image is stored, it is possible to attach information to the shot image. For example, in the case of the cellular phone 30 having the GPS device, the GPS information is attached to the image. In other words, an image file to be recorded in the medium in the cellular phone by means of the cellular phone 30 is produced according to Exif (Exchangeable image file format) file prescription for a digital camera, and an Exif file has Exif tag information, a thumbnail, and a main image compressed in JPEG (joint photographic experts group). As the Exif tag information, the Exif file includes the tag information on date and time of shooting, the tag information on a shooting condition, and the like, and it is possible to write the above described GPS information as this Exif tag information.

Moreover, as the additional information to be attached to the image, in addition to the GPS information (position information), there are the voice information, text information, music information and the like. If the voice information is attached to the image by means of the cellular phone 30, for example, a menu for inputting the voice information is selected while the image is displayed on the cellular phone 30, a recording start button assigned to a button on the cellular phone 30 is pressed to input voice such as the comment, and a recording stop button is pressed to finish inputting the voice.

Once the voice information is inputted in this way, a voice file in a WAV format (Waveform format) which has become standard in Windows (TM) is produced and stored in the medium in the cellular phone. Then, the image file and the voice file are associated with each other to be recorded. If a file name of the image file is "DSCF0001.JPG", this association may be executed by naming the voice file as "DSCF0001.WAV", and having both file names different only in their extensions.

It should be noted that it is also possible not to attach the additional information, such as the voice information or the position information, to the shot image.

(2) The service server 10 is accessed and the image for the print order is selected among the images stored in the medium in the cellular phone 30, on a menu for accepting the print order on the service server. In addition, the print size or the print count for each image for the print order is designated. It should be noted that attaching the voice information to the image may be executed for each image while selecting the image for the print order.

(3) When a sending button is pressed after the image for the print order is selected, the order information including the image data, purchase information and the like is uploaded to the service server 10. Then the additional information is transferred to the service server 10 concurrently.

When the service server 10 accepts the print order, it has the image and the attached information received as one unit (hereinafter, referred to as "image+information"), and manages them for each order in the image/additional information database 13.

(4) The service server 10 sends an acceptance result to the cellular phone 30. In the acceptance result, an access URL (for example, URL: http://abcde.jp/1) which has managed the uploaded image+information for each order, the count, the print size, the charge for print, and due date information are described.

(5) The service server 10 produces the URL for accessing the image+information, and further encodes the URL in the QR code (this encoding in the QR code may be executed at the print server 20 instead of the service server 10). Then the order information including the image, the print size, the user information and the like, and the QR code (or the URL string) are transferred to the print server 20.

(6) The print server 20 produces a photo print 25 having an image 23 and a QR code 24 printed on the print paper by means of the print device 22, based on the order information and the QR code received from the service server 10. This photo print 25 is delivered to the user-appointed recipient or the user's home.

(7) If the additional information attached to the image 23 on the photo print 25 by means of the cellular phone 35 is acquired, the cellular phone 35 is set to a QR code reading mode to identify the QR code 24 printed on the photo print 25. The cellular phone 35 decrypts the identified QR code and acquires the URL.

(8) When the image+information is accessed by using the above described acquired URL, the service server 10 provides the service based on the additional information corresponding to the URL. For example, if the image+information is accessed by using the URL (http://abcdejp/1/1), the service server 10 sends the additional information (the voice information and the position information) attached to the image 23 to the cellular phone 35, and provides a service for reproducing the voice on the cellular phone 35, or a service for displaying the position information for shooting the image, on a monitor on the cellular phone 35.

It should be noted that if there are a plurality of additional information in one image, the additional information may be selected appropriately, and if there is no additional information, the image may be captured as a standby image for the cellular phone 35. Furthermore, the image may be browsed or downloaded, which is effective in the case where the image has been deleted from the medium in the cellular phone 30 after giving the print order.

Moreover, in the case of the position information, a map having a shooting position described thereon is displayed on the cellular phone 30, instead of the GPS information (the latitude and the longitude). In other words, the service server 10 reads the map information on a predetermined range centered on a position indicated by the GPS information, from the map information database 16 (FIG. 2), based on the GPS information attached to the image, and sends this map information to the cellular phone 35 and displays the map on the monitor of the cellular phone 35.

(9) Similarly, when the image+information is accessed by using the access URL obtained from the acceptance result, the images may be browsed for each order and the additional information may be also obtained.

(10) This service stores the image+information for a certain period after the print order is accepted, and provides the above described services. Though the provision of the above described services is finished after the certain period has been elapsed, the storage period may be extended by paying another charge (a charge for storage).

Moreover, the uploaded images are managed for each order, but not for each user. Thus, with the URL acquired from the acceptance result, the images may be browsed only for each order, and all the images uploaded by the user may not be browsed together.

Therefore, if the user wants a service for browsing all the images uploaded by the user together, the user subscribes for an owner image management service. When the user subscribes for the owner image management service, he decides his ID and his password PW and registers with the service. It should be noted that another charge would occur for this service.

(11) When the user subscribes for the owner image management service, the user collects all the URLs from the acceptance result stored in the cellular phone 30 by means of software, and sends the collected URLs, the ID and the PW to the service server 10. The service server 10 associates all the received URLs to produce a browsing page. Thereafter, the service server 10 manages the images for each owner with the ID and the PW.

(12) When the owner image management service is accepted, the user also may access from a PC 40 and the like. In other words, the user may enter an owner page by accessing a certain URL and inputting the ID and the PW. The owner page is divided into the page for the cellular phone 30 and the page for the PC 40, which is enhanced more than the page for the cellular phone 30.

It should be noted that, though the image and the like for the print order is uploaded from the cellular phone 30 to the service server 10 in this embodiment, the embodiment of the present invention is not limited thereto, and the image for the print order may be selected among the images captured from a digital camera 41 and stored in the PC 40 as shown in FIG. 1, and the image and the like for the print order may be uploaded from the PC 40 to the service server 10.

In addition, when the user gives his friend the photo print having the QR code printed thereon, his friend may also obtain the additional information (the voice information and the like inputted by a friend) attached to the image, by reading the QR code by means of his own cellular phone.

Furthermore, the additional information (especially the voice information) to be attached to the image may be added, after the image for the print order has been uploaded, to the image as the additional information on the image, or alternatively, if the voice information has been already attached to the image, the voice information may be updated with new voice information.

Figure 4:
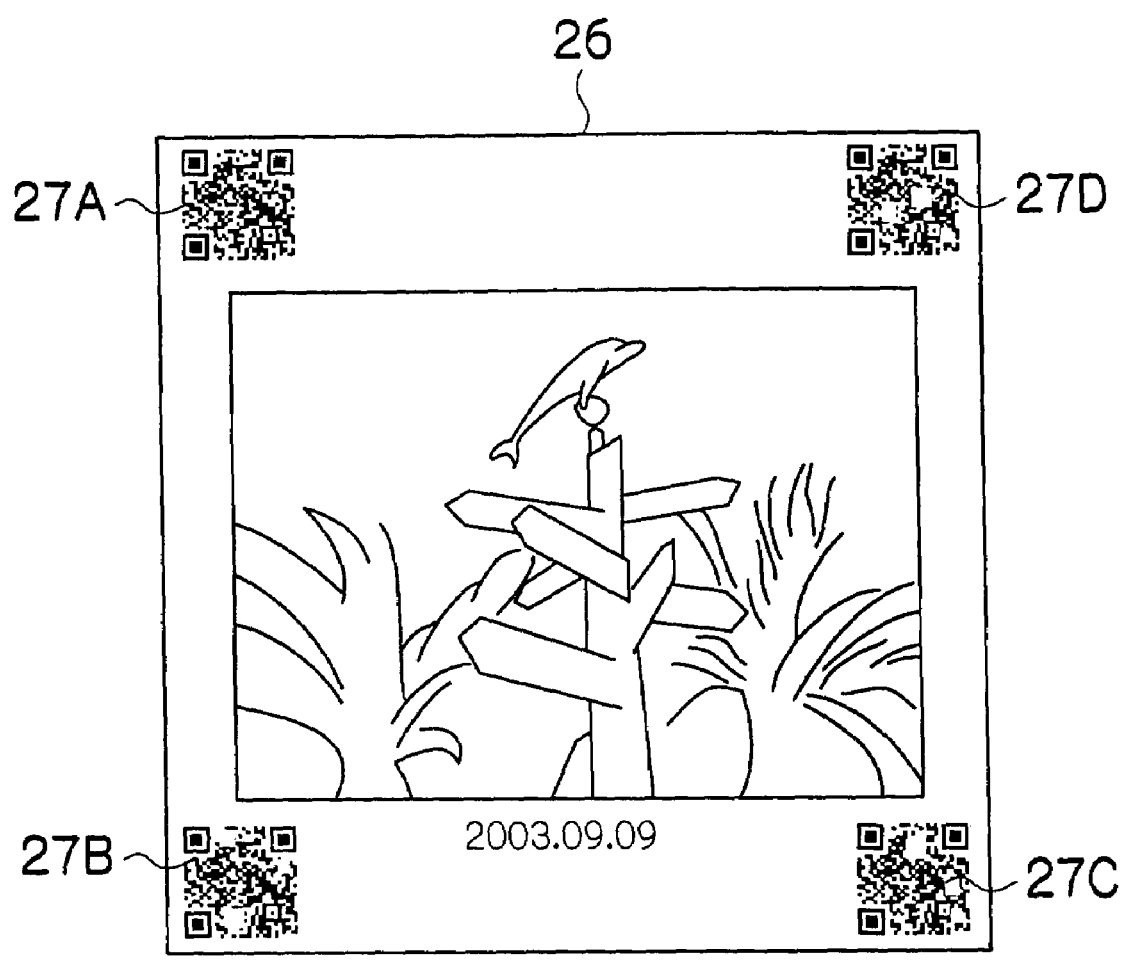
FIG. 4 shows an embodiment of a photo print having a QR code printed thereon.

FIG. 4 shows an embodiment of the photo print having the QR code printed thereon.

This photo print 26 has QR codes 27A to 27D printed on its four corners.

Information on the URL for accessing the image+information may be embedded in any one of these QR codes 27A to 27D, and the URL for accessing an advertisement or information other than the URL (a character code such as "You missed") may be embedded in other QR codes. A mechanism is provided in which a point is added only when the user accesses the advertisement for the first time, and the point is restored to the user. Thereby, it is possible for the user to read the QR code with a feeling as if the user scratches a scratch-off card, and to obtain enjoyment which may not be obtained without reading the QR code.

Moreover, if there is the plurality of additional information on the image, the respective additional information may be assigned to the QR codes 27A to 27D respectively so that the respective additional information can be obtained from the respective QR codes.

It should noted that, though if there is no additional information on the image, the image is captured as the standby image for the cellular phone in this embodiment, the embodiment of the present invention is not limited thereto, and an unused ringing melody may be designated randomly from a table which stores ringing melodies in the cellular phone, and the selected melody may be reproduced. Since hit tunes change rapidly, a downloaded melody would tend to be buried, however, the melodies stored uselessly may be utilized effectively according to the present invention as described above.

Moreover, since some image sizes of the images uploaded from the cellular phone may comprise over hundreds of thousand of pixels to a million of pixels, especially an image having less pixels needs to be printed in a small size in order to maintain its image quality. In this case, a large space would occur in the photo print, however, this space may be utilized effectively by printing the QR code in this space. It should be noted that the larger the space is, the larger the QR code may be printed therein and much more information may be embedded in the QR code.

Furthermore, not only in the case of printing in the space of the photo print, the QR code and the like may be embedded in a non-visible form in the image. In this case, the QR code and the like is preferably embedded in the center of the photo print.

In addition, though the QR code is printed in the photo print in this embodiment, the embodiment of the present invention is not limited thereto, and other two-dimensional code, a bar code or the URL string may be printed.

What is claimed is:

1. A service server for communicating with a first user terminal and a second user terminal via a network and accepting a print instruction for an image uploaded from the first user terminal, comprising:

a receiving device which receives the image for which the print instruction is given from the first user terminal, and additional information associated with the image;

a database which manages the additional information on the received image;

an access information issuing device which issues access information for accessing the additional information managed in the database;

a print instruction device which sends a string or a code including the access information, along with the image for which the print instruction has been accepted, to a printer to print the string or the code and the image on a print medium;

and a sending device which, when the second user terminal accesses, based on the string or the code including the access information printed on the print medium, by using the access information, reads from the database the additional information corresponding to the access information, and sends the additional information to the second user terminal which has accessed.

2. The service server according to claim 1, wherein the additional information includes at least one of voice information, position information, text information and music information.

3. The service server according to claim 1, wherein the additional information includes shooting position information, and the sending device sends, based on the shooting position information read out from the database, map information including the position.

4. The service server according to claim 1, wherein the printer is a printer in the service server, or a printer in a printer server connected to the network.

5. The service server according to claim 1, wherein the database manages the received image and the additional information associated with the image, and when the second user terminal accesses, based on the string or the code including the access information printed on the print medium, by using The access information, The sending device reads from the database an image managed correspondingly to the access information, and sends the image to the second user terminal.

6. The service server according to claim 1, wherein the additional information includes voice information, and when the receiving device receives newly the voice information associated with the image managed in the database, from the first or the second user terminal, the newly received voice information is attached to the image in the database, or the voice information on the image is updated with the newly received voice information.

7. The service server according to claim 1, wherein the first user terminal is a camera-equipped cellular phone.

8. The service server according to claim 1, wherein The code including the access information is a two-dimensional code.

9. The service server according to claim 8, wherein the second user terminal is a camera-equipped cellular phone having a function of decrypting the image in which a two-dimensional code has been shot to acquire the access information.

10. The service sewer according to claim 1, wherein the first user terminal and the second user terminal are identical to each other.

11. A print service method for performing print service via a network, comprising the steps of:

uploading an image for which a print instruction is given from a first user terminal via a network, and additional information associated with the image to a service server;

managing the additional information in a database;

issuing access information for accessing the additional information;

printing a string or a code including the access information, along with the image for which the print instruction has been accepted, onto a print medium;

accessing from a second user terminal, based on the string or the code including the access information printed on the print medium, by using the access information; and when the access is executed by using the access information, reading from the database the additional information corresponding to the access information, and sending the additional information to the second user terminal.

12. A user terminal, in an image data communication system in which the user terminal and a service server may communicate with each other via a network, comprising:

a print image designation device which designates the image data to be printed;

a print image display device which displays image data to be printed;

an additional information input device which inputs additional information associated with the image data to be printed;

an additional information sending device which sends the additional information inputted by the additional information input device, to the service server;

an access information input device which inputs a string or a code including access information for accessing the additional information issued by the service server;

an access information sending device which sends the access information to the service server;

an additional information receiving device which receives the additional information corresponding to the access information from the service server; and an additional information output device which outputs the additional information.

13. The user terminal according to claim 12, further comprising: a print image storage device which stores at least one or more of the image data to be printed, and a print image sending device which sends the image data to be printed, to the service server.

* * * * *